(12) United States Patent
Gandham et al.

(10) Patent No.: US 9,762,507 B1
(45) Date of Patent: Sep. 12, 2017

(54) NETWORK LOAD BALANCING USING MULTICAST OR PACKET REPLICATION

(71) Applicant: Google Inc., Mountain View, CA (US)

(72) Inventors: Shashidhar Rao Gandham, Fremont, CA (US); Carlo Contavalli, Millbrae, CA (US)

(73) Assignee: Google Inc., Mountain View, CA (US)

( * ) Notice: Subject to any disclaimer, the term of this patent is extended or adjusted under 35 U.S.C. 154(b) by 269 days.

(21) Appl. No.: 14/104,413

(22) Filed: Dec. 12, 2013

Related U.S. Application Data

(60) Provisional application No. 61/782,676, filed on Mar. 14, 2013.

(51) Int. Cl.
*H04L 29/06* (2006.01)
*H04L 12/927* (2013.01)

(52) U.S. Cl.
CPC .......... *H04L 47/806* (2013.01); *H04L 63/101* (2013.01)

(58) Field of Classification Search
CPC ....... H04L 12/18; H04L 45/16; H04L 63/101; H04L 47/806
USPC ......................................................... 726/22
See application file for complete search history.

(56) References Cited

U.S. PATENT DOCUMENTS

| | | | |
|---|---|---|---|
| 6,456,597 B1 * | 9/2002 | Bare | H04L 29/12009 370/252 |
| 6,625,773 B1 | 9/2003 | Boivie et al. | |
| 6,751,219 B1 | 6/2004 | Lipp et al. | |
| 7,693,050 B2 * | 4/2010 | Achlioptas | H04L 45/745 370/229 |
| 8,699,486 B1 * | 4/2014 | Luo et al. | 370/390 |
| 2007/0211722 A1 * | 9/2007 | Subramanian | 370/390 |
| 2013/0329605 A1 * | 12/2013 | Nakil et al. | 370/255 |

FOREIGN PATENT DOCUMENTS

EP           2 031 796 B1     3/2009

* cited by examiner

*Primary Examiner* — Mahfuzur Rahman
*Assistant Examiner* — Narciso Victoria
(74) *Attorney, Agent, or Firm* — McDermott Will & Emery LLP (57) ABSTRACT

Network load balancing may be performed in a cluster by deploying multicasting or replication. In particular, one or more multicast trees may be deployed within the cluster. Packets may be multicast towards the hosts over the multicast tree(s) to reach the hosts in a pool of hosts associated with a given Virtual Internet Protocol ("VIP") address. Packets may be filtered before the packets reach the hosts to ensure that each host only receives packets for the session the host is handling. The filtering may be performed at various levels of the multicast tree. Replication may be deployed instead of multicasting to realize the same network load balancing.

16 Claims, 10 Drawing Sheets

NETWORK LOAD BALANCING USING MULTICAST OR PACKET REPLICATION

RELATED APPLICATIONS

The present application claims priority to a U.S. provisional application No. 61/782,676, filed Mar. 14, 2013, the contents of which are incorporated herein by reference.

BACKGROUND

A cluster generally refers to a group of hosts, such as servers, that are interconnected through a network to work as a centralized data processing resource. In most instances, a single host cannot handle the entire traffic for a given service; rather a pool of hosts is required to properly handle the traffic for the service. Since a cluster might support multiple services at the same time, each service is associated with a virtual IP (VIP) address that is used by clients to access the service. Each VIP address has a different set of hosts that provide a service associated with the VIP address.

Such clusters may employ network load balancers that split the incoming traffic for a particular VIP address onto all of the hosts of the pool associated with the VIP address. Ideally, the load balancer directs a packet to a less busy host in the pool of hosts so as to better share the load of processing the packets for the service. There are a number of different strategies that may be employed to perform such load balancing. One approach is to employ a hashing mechanism to evenly split incoming packets among the hosts in the pool associated with the VIP address. However, the current load balancing mechanisms do not ensure that packets that belong to a given session are sent to the same host in the pool even when the membership of the pool changes.

SUMMARY

Various embodiments may provide a method of performing network load balancing in a cluster having switching nodes and hosts. The method comprised defining a first multicast tree in the cluster for a service. The multicast tree extends from an initial one of the switching nodes to a first pool of the hosts. A second multicast tree may be defined for the service in the cluster. The second multicast tree extends from a selected one of the switching nodes to a second pool of hosts. The method further includes multicasting over the first multicast tree so that the packets reach the first pool of hosts. The method further includes multicasting over the second multicast tree so that the packets reach the second pool of hosts. The packets are incoming packets for the service to the initial one of the switching nodes. The packets are processed with the first pool of hosts and the second pool of hosts.

In some embodiments, a method of performing network load balancing in a cluster having switching nodes and hosts includes defining a first multicast tree in the cluster for a service. The multicast tree extends from an initial one of the switching nodes to a pool of the hosts. The method further includes receiving incoming packets at the initial one of the switching nodes and replicating the incomings packets at the initial one of the switching nodes. The method also includes forwarding the incoming packets to a first set of the switching nodes in the first multicast tree and forwarding the replicated packets to a second set of the switching nodes in the first multicast tree so that packets reach the pool of the hosts. The packets are processed with the pool of the hosts.

Embodiments may also provide a system having a network controller executing instructions for defining a first multicast tree in a cluster for a service. The first multicast tree extends from an initial switching node in the cluster to a pool of hosts. The network controller may execute instructions to replicate incomings packets received at the initial switching node. The network controller may enable forwarding the incoming packets to a first set of switching nodes in the first multicast tree and forwarding the replicated packets to a second set of switching nodes in the first multicast tree so that packets reach the pool of hosts.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

In accordance with exemplary embodiments described herein, network load balancing may be performed in a cluster by deploying multicasting or replication. In particular, one or more multicast trees may be deployed within the cluster. Packets may be multicast towards the hosts over the multicast tree(s) to reach the hosts in a pool of hosts associated with a given VIP address. Packets may be filtered before the packets reach the hosts to ensure that each host only receives packets for the session the host is handling. The filtering may be performed at various levels of the multicast tree. This approach has the benefit of requiring fewer network load balancers than conventional systems, and can better accommodate changes in the membership composition of the pool of hosts. Replication may be deployed instead of multicasting to realize the same network load balancing.

Figure 1:
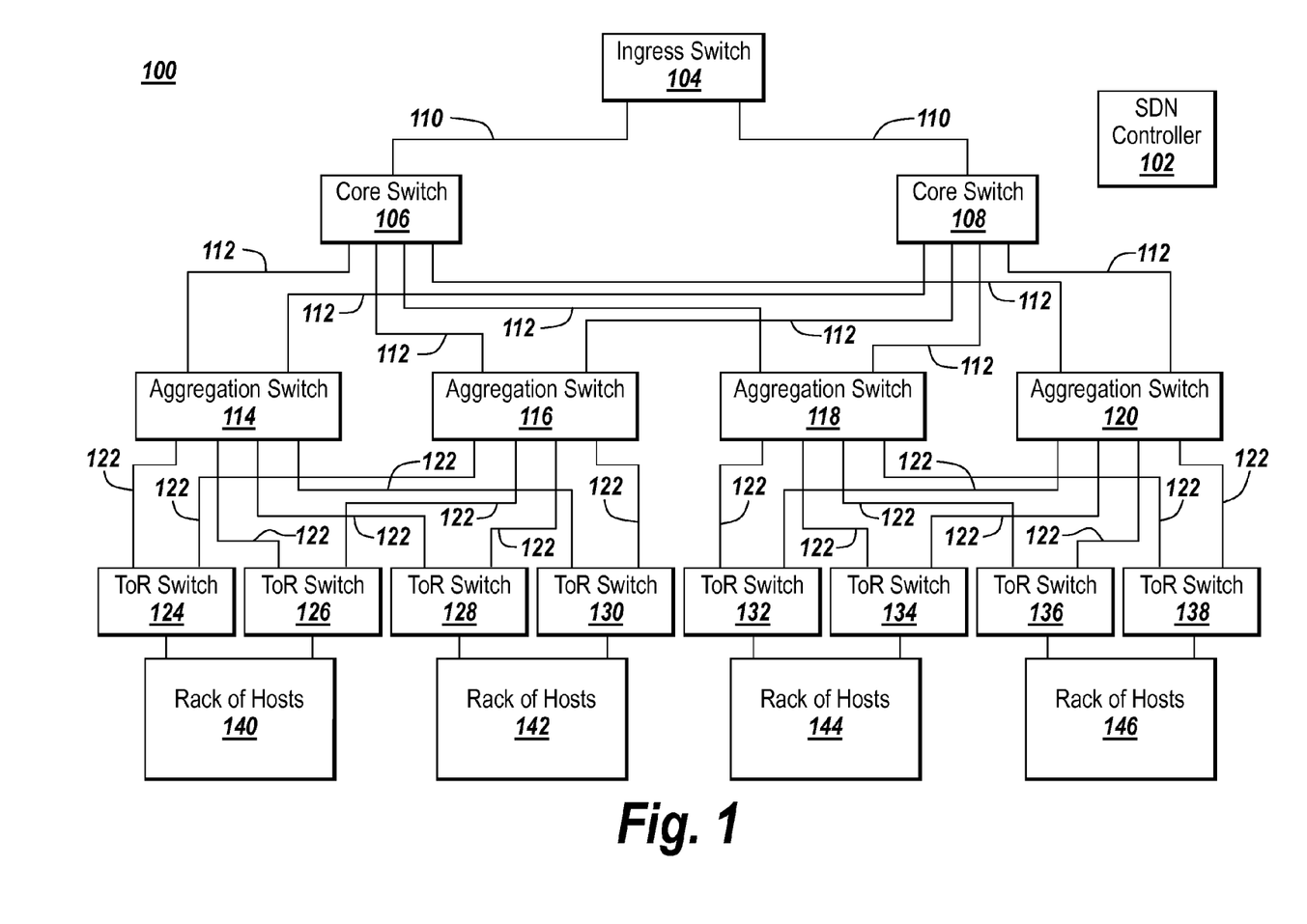
FIG. 1 depicts an illustrative cluster configuration for practicing exemplary embodiments.

FIG. 1 depicts an exemplary cluster 100 such as may be found in a data center for practicing exemplary embodiments described herein. Those skilled in the art will appreciate that the depiction of the cluster 100 in FIG. 1 is intended to be merely illustrative and not limiting. The cluster 100 may provide a number of services. Each service may have a VIP address associated with the service.

Although the discussion below references "switches," the term is intended to encompass any nodes that provide forwarding capabilities, including but not limited to switches and routers. More generally, the nodes are referenced as "switching nodes" in the claims, which is intended to encompass switches and/or routers.

The cluster 100 includes an ingress switch 104 for receiving incoming network traffic. The ingress switch 104 is connected to core switch 106 and core switch 108 via links 110. These links 110 may be electrical or optical links. The links illustrated in FIG. 1 transmit the incoming network traffic in form of packets among the components of the cluster 100. Core switch 106 is, in turn, connected via links 112 to aggregation switches 114, 116, 118 and 120. Similarly, core switch 108 is connected via links 112 to aggregation switches 114, 116, 118 and 120. Each aggregation switch 114, 116, 118 and 120 is coupled to four top of the rack (ToR) switches in the cluster configuration depicted in FIG. 1. Aggregation switch 114 is coupled to ToR switches 124, 126, 128 and 130 via links 122. Aggregation switch 116 is connected to these same ToR switches 124, 126, 128 and 130 via links 122. Aggregation switches 118 and 120 are connected to ToR switches 132, 134, 136 and 138 via links 122. Pairs of ToR switches are coupled to racks of hosts. Each host may be, for example, a server found in the rack of hosts. ToR switches 124 and 126 are connected to rack of hosts 140, and ToR switches 128 and 130 are connected to rack of hosts 142. ToR switches 132 and 134 are connected to rack of hosts 144, and ToR switches 136 and 138 are connected to rack of hosts 146.

A Software Defined Networking (SDN) controller 102 is interfaced with the switching components 104, 106, 108, 114, 116, 118, 120, 124, 126, 128, 130, 132, 134, 136 and 138. The SDN controller 102 may provide control plane functionality for the switching components within the cluster. In one illustrative case, the SDN controller 102 is an OpenFlow controller that utilizes functionality specified in the OpenFlow protocol.

Figure 2A:
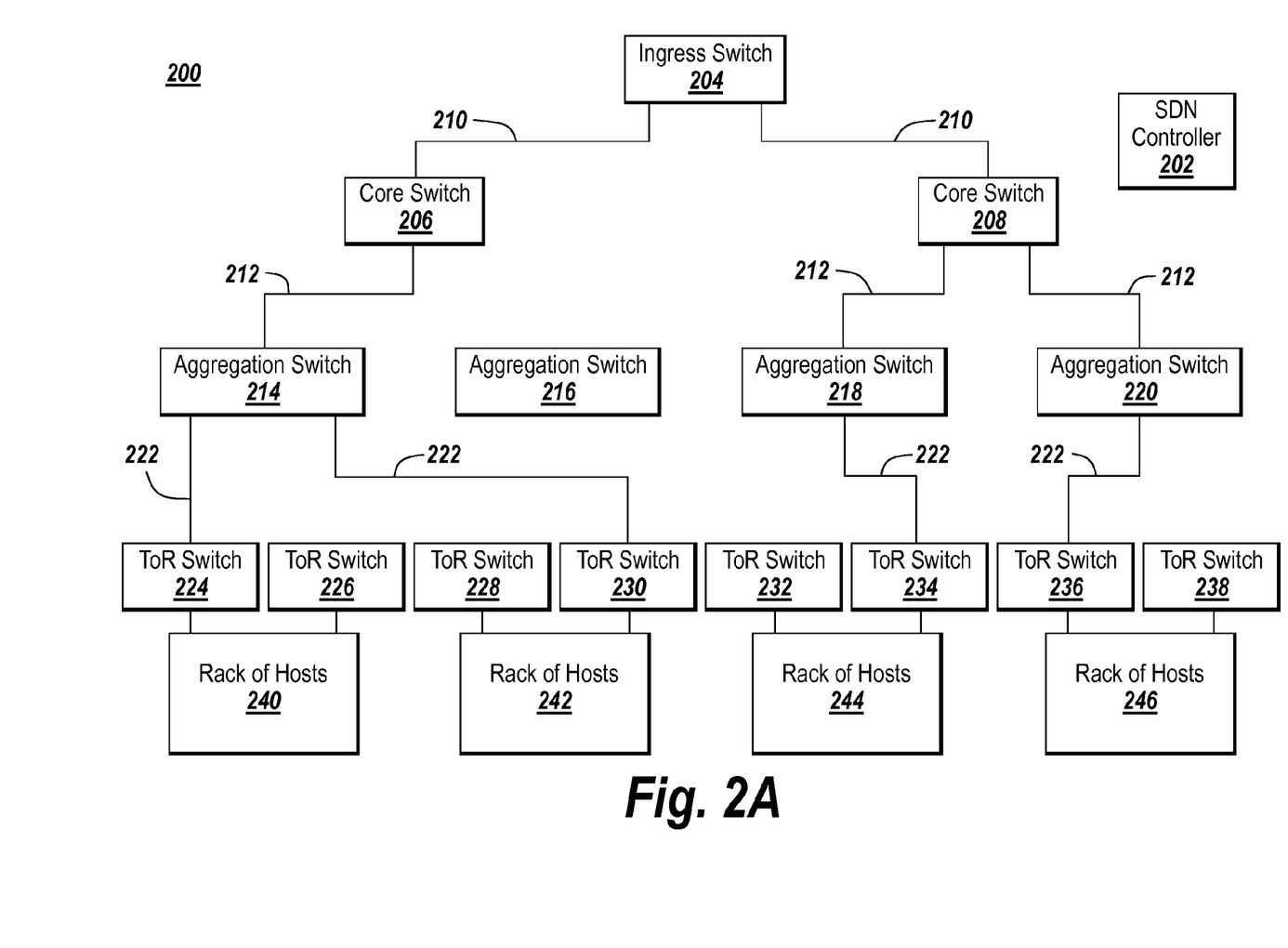
FIG. 2A depicts an exemplary multicast tree for the cluster of FIG. 1.

FIG. 2A illustrates an example of a multicast tree that is deployed in the cluster to provide the network load balancing of the illustrative embodiments. The multicast tree is built to replicate the ingress traffic in cluster 200 such that the traffic reaches all of the hosts in a given pool of hosts. In the example case shown in FIG. 2A, the multicast tree includes links 210 that couple ingress switch 204 with core switches 206 and 208. The multicast tree also includes link 212 that connects core switch 206 with aggregation switch 214. Aggregation switch 214 is coupled in this multicast tree to ToR switches 226 and 230, that, in turn, are coupled to the hosts in the host pool for the service in question. The multicast tree includes links 212 that couple core switch 208 with aggregation switch 218 and aggregation switch 220. The multicast tree includes links 222 that couple the aggregation switch 218 to ToR switch 234 and couple aggregation switch 220 to ToR switch 236. The multicast tree does not include links to aggregation switch 216 or ToR switches 226, 228, 232 and 238. The cluster 200 shown in FIG. 2A also includes SDN controller 202 and rack of hosts 240, 242, 244 and 246. Using the multicast tree illustrated in FIG. 2A, incoming network traffic may be forwarded from ingress switch 204 to hosts of the rack of hosts 240, 242, 244 and 246.

Figure 2B:
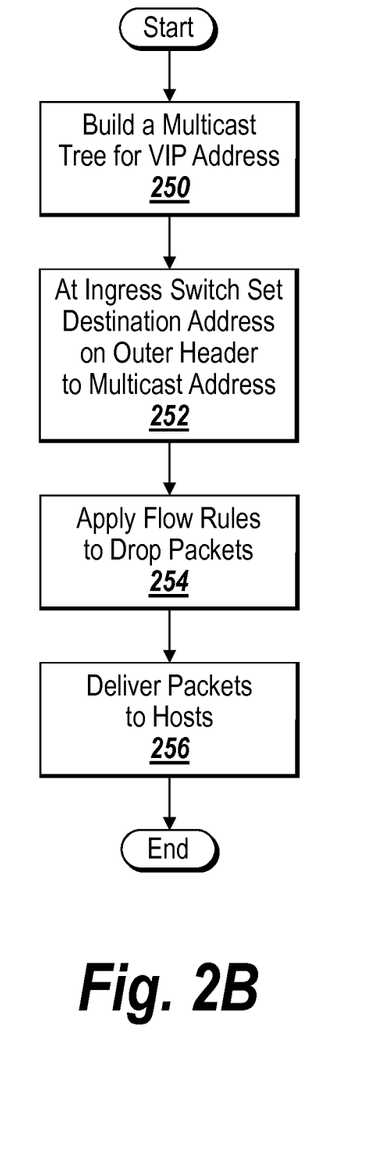
FIG. 2B is a flow chart that illustrates the steps that are performed to employ the multicast tree of FIG. 2A in network load balancing.

FIG. 2B depicts a flow chart of the steps that may be performed to deploy one or more multicast trees in a cluster, such as that depicted in FIG. 2A. First, a multicast tree is built for a given VIP address (Step 250). This VIP address is associated with a service, as was mentioned above. The multicast tree may be built using conventional approaches. For example, an IP multicast group address may be defined, and a multicast distribution tree may be established for receivers that wish to receive the multicast packets. After the multicast tree has been defined, the ingress switch 204 may set the destination address on the outer header of incoming packets to the multicast address (Step 252). Setting the destination address to the multicast address prompts the packets to be multicast along the given multicast tree.

Certain flow rules may be applied via the SDN controller 202 to drop some packets and lower bandwidth requirements (Step 254). In generally, each host is designated to handle a portion of the traffic. The flow rules may allow to drop the traffic that corresponding host will not handle. For example, traffic received at aggregation switch 214 may deploy flow rules that forward only traffic that is designated for the hosts in rack of hosts 240 and 242 that are coupled to ToR switch 224 and ToR switch 230. All other traffic may be discarded. Depending on the depth of the tree structure for the cluster, similar flow rules may be applied at higher levels of the multicast tree to effect filtering of packets. In other words, higher level switches maybe configured to drop given flows and thus reduce the bandwidth requirements.

After the given flows have been dropped, the packets are ultimately delivered to the appropriate hosts on the rack of hosts 240, 242, 244 and 246 (Step 256).

Figure 3A:
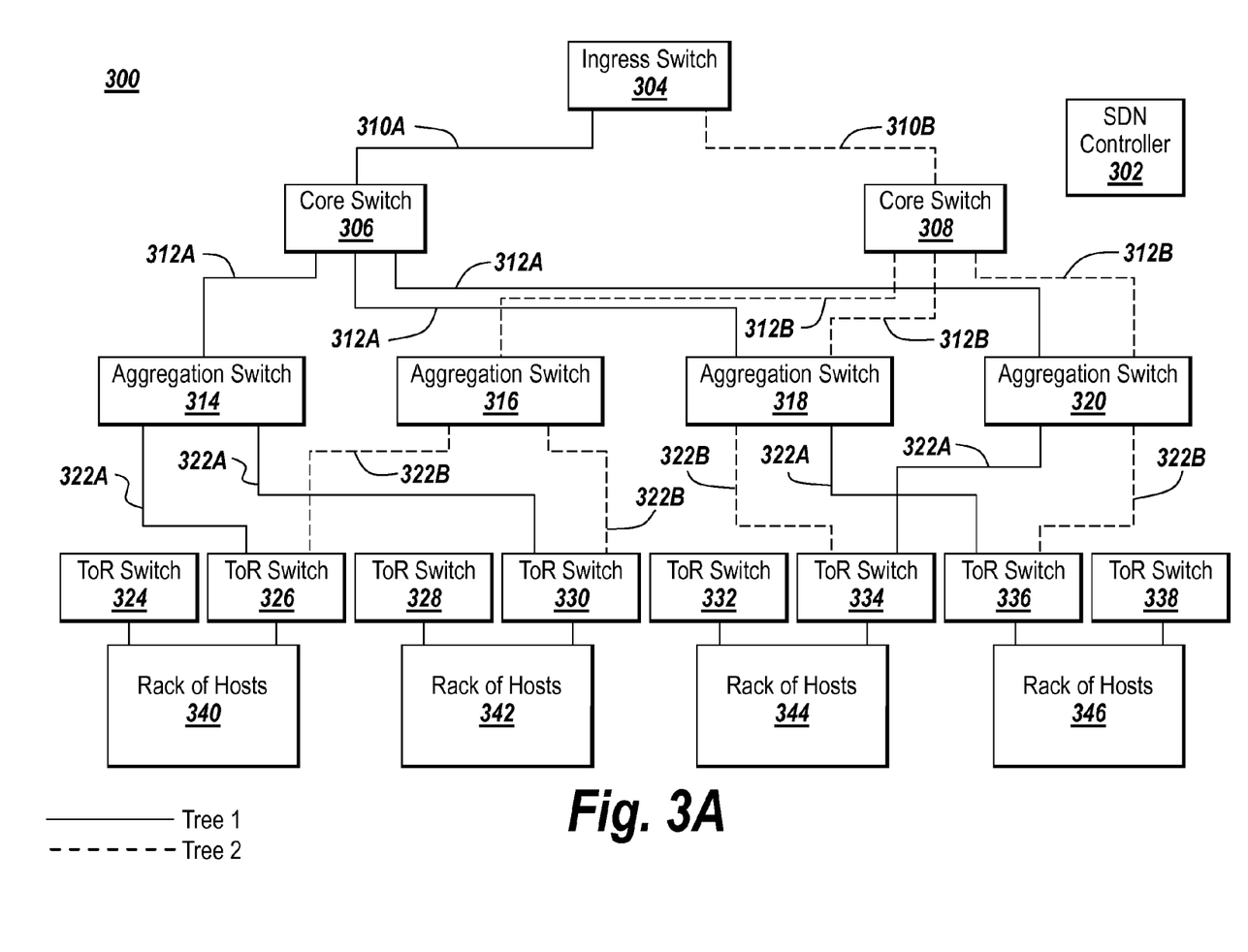
FIG. 3A depicts an example of multiple multicast trees deployed in the cluster of FIG. 1.

In order to reduce the impact of link failure, it may be useful to provide multiple multicast trees within the cluster. FIG. 3A depicts an example of a cluster 300 with two multicast trees. In FIG. 3A, links of the first multicast tree are illustrated with straight lines while the links of the second multicast tree are illustrated with dashed lines. In the first multicast tree, link 310A connects ingress switch 304 with core switch 306. Links 312A are part of the first multicast tree and connect core switch 306 with aggregation switches 314, 318 and 320. The first multicast tree also includes links 322A that connects aggregation switch 314 with ToR switch 326 and with ToR switch 330, respectively. Lastly, the first multicast tree includes links 322A that connect aggregation switch 318 with ToR switch 336 and aggregation switch 320 with ToR switch 334.

In the example depicted in FIG. 3A, the second multicast tree includes link 310B that couples ingress switch 304 with core switch 308. At the next layer of the second multicast tree, links 312B couple core switch 308 with aggregation switches 316, 318 and 320. At the next level of the multicast tree, links 322B connect aggregation switch 316 with ToR switch 326 and with ToR switch 330. In addition, links 322B connect aggregation switch 318 with ToR switch 334 and aggregation switch 320 with ToR switch 336.

In FIG. 3A, there are no links to ToR switches 324, 328, 332 and 338. Nevertheless, hosts on each of the rack of hosts 340, 342, 344 and 346 are reachable via both multicast trees.

The two multicast trees depicted in FIG. 3A are disjoint in that they do not contain shared links. Thus, if a link fails, one of the multicast trees will not be affected. Thus, using multiple multicast trees helps to avoid hardship should one of the links fail. For example, in FIG. 3A, packets routed from ingress switch 304 may reach each of the rack of hosts 340, 342, 344 and 346 via both the first multicast tree and the second multicast tree. In case the first multicast tree fails, the hosts 340, 342, 344 and 346 will still receive the packets via the second multicast tree.

It will be appreciated that the multicast tree structures illustrated in FIG. 3A are for illustrative purposed and should not be construed as limiting. Other multicast tree structures may be implemented in cluster 300 that may transmit packets from ingress switch 304 to rack of hosts 340, 342, 344 and 346. One of ordinary skill in the art will appreciate any number of multiple multicast trees may be implemented in cluster 300 and that the illustrated two multicast trees should not be construed as limiting.

Figure 3B:
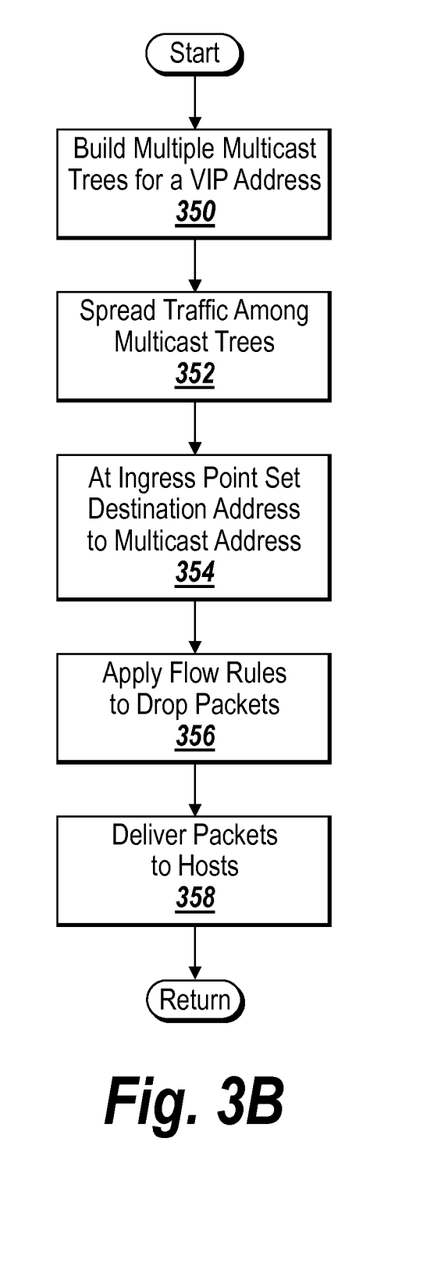
FIG. 3B is a flow chart depicting the steps that are performed to use the multiple multicast trees of FIG. 3A in an illustrative embodiment.

FIG. 3B is a flow chart depicting the steps that may be performed to use the multiple multicast trees. Initially, multiple multicast trees for a VIP address are built (Step 350). The traffic is then spread, such as by ingress switch 304, among the multicast trees (Step 352). At the ingress point for each multicast tree, the destination address may be set to a multicast address (Step 354). The flow rules may be established by SDN controller 302 and may be applied to drop packets at higher level switches, such as at aggregation switches 314, 316, 318 and 320 (Step 356). As was discussed above such filtering of packets may help reduce the bandwidth by forwarding only packets that the hosts are supposed to handle. The rest of the packets may be discarded. Ultimately, the packets are delivered to the appropriate hosts (Step 358).

Figure 4A:
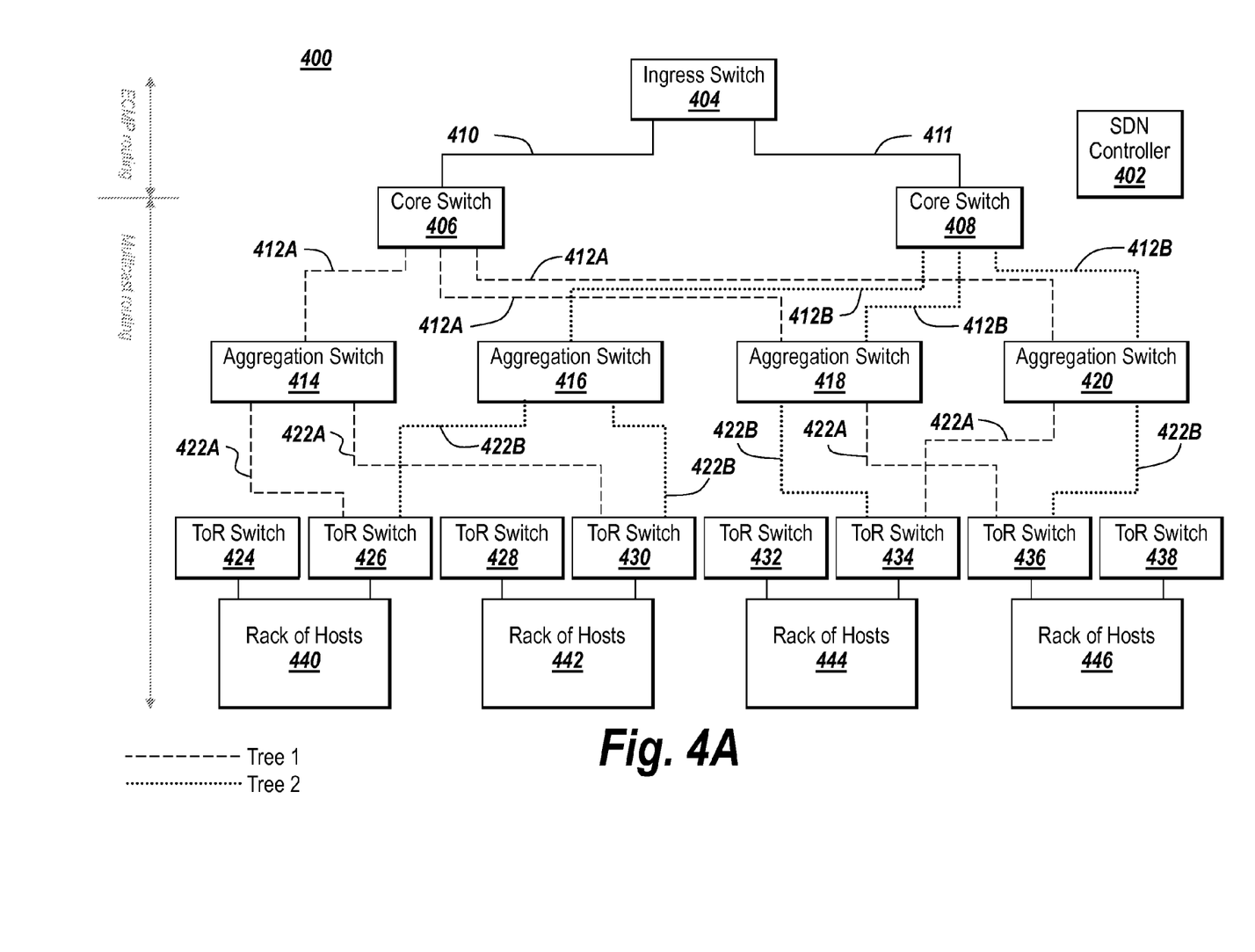
FIG. 4A depicts the cluster of FIG. 1 when a combination of equal cost multiple path (ECMP) and multicast approaches are employed in a cluster to realize network load balancing.

The multicast approach may be combined with ECMP routing to reduce bandwidth requirements at the top levels of the cluster. FIG. 4A shows an example where ECMP routing is combined with multicast routing in the cluster 400. In particular, ECMP hashing may be employed on the incoming traffic received at ingress switch 404 to split the traffic into two flows. One flow is directed over link 410 to core switch 406, and another flow is directed over link 411 to core switch 408. The traffic may be split in any given ratio between core switch 406 and core switch 408. For example, core switch 406 and core switch 408 may receive equal amounts of the traffic. In some embodiments core switch 406 may receive more/less traffic than core switch 408.

The traffic may be forwarded using multicast routing at the lower levels of cluster 400. As illustrated in FIG. 4A, two separate multicast trees are defined for the lower levels of the cluster. In a first multicast tree, links 412A are included to couple core switch 406 with aggregation switches 414, 418 and 420. At the next layer of the first multicast tree, links 422A couple aggregation switch 414 with ToR switch 426 and with ToR switch 430. Similarly, links 422A couple aggregation switch 418 with ToR switch 436 and couple aggregation switch 420 with ToR switch 434.

In the second multicast tree, links 412B couple core switch 408 with aggregation switches 416, 418 and 420. At the next layer of the second multicast tree, aggregation switch 416 is coupled with ToR switch 426 and ToR switch 430 via links 422B. Aggregation switch 418 is coupled to ToR switch 434 via link 422B, and aggregation switch 420 is coupled to ToR switch 436 via link 422B.

The multicast trees of FIG. 4A do not include links to ToR switches 424, 428, 432 and 438 which interface with rack of hosts 440, 442, 444 and 446, respectively. However, each of the rack of hosts 440, 442, 444 and 446 are reachable via both the first multicast tree and the second multicast tree.

By combining ECMP routing with multicast routing, this illustrative embodiment helps to mitigate the burden of forwarding a significant portion of the bandwidth by dividing the traffic between core switch 406 and core switch 408. In the illustrative case depicted in FIG. 4A, half the bandwidth may be directed to core switch 406 and half the bandwidth may be directed to core switch 408. One of ordinary skill in the art will appreciate that the traffic can be divided in any selected ratio between the core switches and that an equal division of the incoming traffic is discussed for illustration purposes only.

Figure 4B:
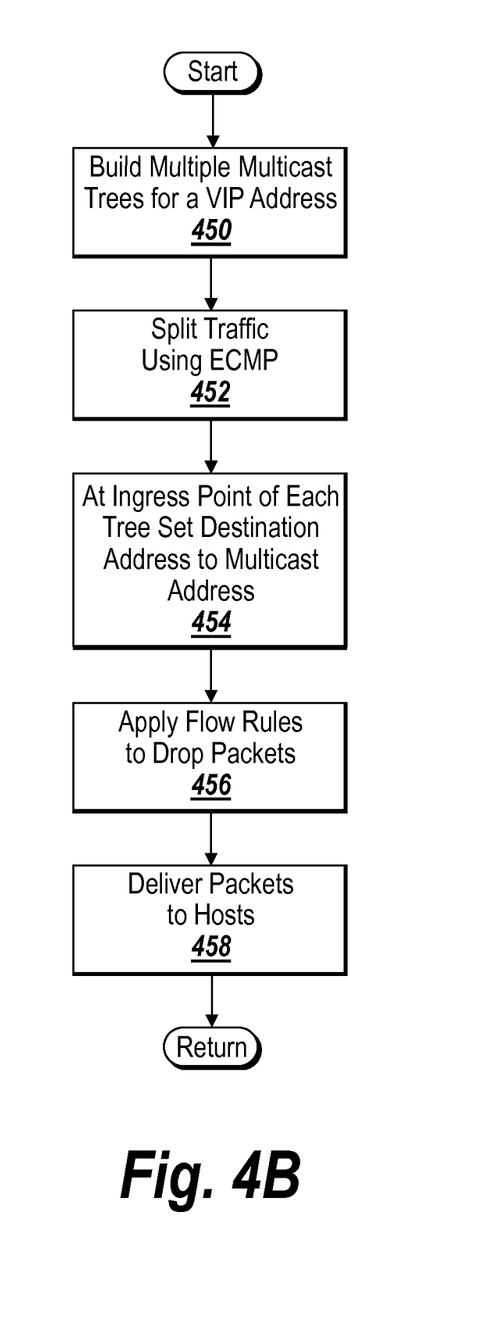
FIG. 4B is a flow chart illustrating steps that are performed in deploying both ECMP and multicast to realize network load balancing in an exemplary embodiment.

FIG. 4B is a flow chart illustrating the steps that are performed to combine ECMP routing with multicast routing for load balancing in exemplary embodiments disclosed herein. First, multicast trees are built for a given VIP address (Step 450). The incoming traffic then is split using ECMP (Step 452). In ECMP, a hash is applied to information contained in the outer header to split the traffic flow. In the illustrative case of FIG. 4A, the traffic flow is split over links 410 and 412 to core switches 406 and 408 respectively. At the ingress points for the given multicast trees, e.g. core switches 406 and 408 respectively, the destination address is set to a multicast address so that the packet is multicast to the respective trees (Step 454). The flow rules, which may be established by SDN controller 402, are applied to drop extraneous packets so as to reduce bandwidth requirements (Step 456). The packets are then delivered to the appropriate hosts in the rack of hosts (Step 458).

Figure 5:
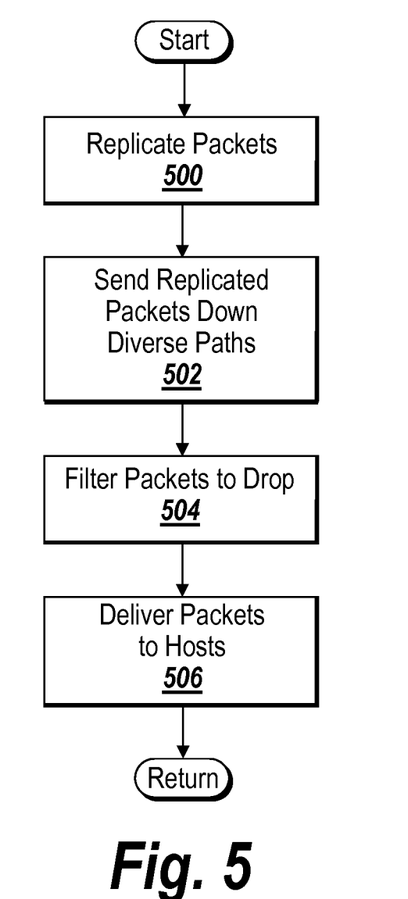
FIG. 5 is a flow chart depicting steps performed in an alternative embodiment in which packets are replicated without relying on multicast.

It should be appreciated that multicast routing need not be used in practicing exemplary embodiments. Instead, replication may be used. FIG. 5 is a flow chart depicting steps that may be performed in such an approach. Packets are replicated so as to have multiple instances of packet flow over multiple links in the tree of cluster (Step 500). The replicated packets are then sent down the diverse paths (Step 502). Thus, for example, the ingress switch 104 may generate a replica of an incoming packet and send one packet to core switch 106 and a replica packet to core switch 108. The core switches 106 and 108 may, in turn, generate their own replicas as warranted.

So as to reduce the bandwidth requirements, the packets may be filtered at the various switching components to drop extraneous packets (Step 504). Ultimately, the packets are delivered to the appropriate hosts (Step 506).

Figure 6:
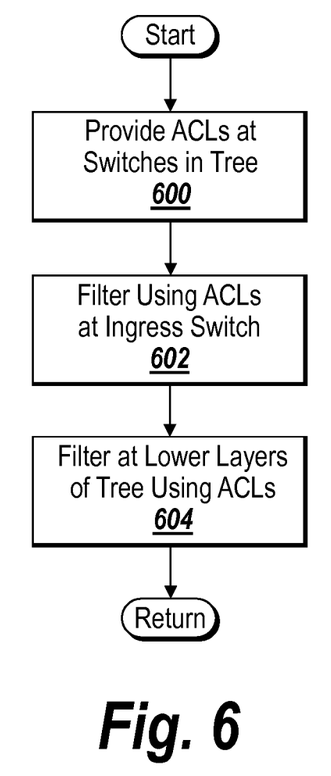
FIG. 6 is a flow chart illustrating steps that are performed using access control lists (ACLs) to avoid certain types of network attacks.

Access Control Lists (ACLs) maybe employed to provide protection against attack traffic on the network. Attack traffic is generally characterized by an explicit attempt by attackers to prevent legitimate users of a service from using that service. Attack traffic floods the network with unnecessary traffic. Thus, protection against attach traffic is paramount for efficient use of the network. According to various embodiments, an ACL may be deployed at the ingress switch to filter out the attack traffic. When the ingress traffic is split into several multicast trees, it is known what subset of multicast trees the attack traffic will fall into. Thus, an ACL may be deployed at switches in lower levels of the cluster to remove such attack traffic. FIG. 6 provides an overview of the steps that may be deployed to use such ACLs. Initially, the ACLs are provided in one or more switches within the tree of the cluster (Step 600). When an attack is underway, the ACLs are used to filter out attack traffic. For example, an ACL may be used at the ingress switch 104 to filter out attack traffic (Step 602). In some embodiments, attack traffic with high data rate may be filtered out first. Then, ACLs at lower layers of the tree of the cluster filter out additional attack traffic (Step 604). The ACLs at lower layers may be better suited at filtering out fine/narrow attack flows.

Figure 7:
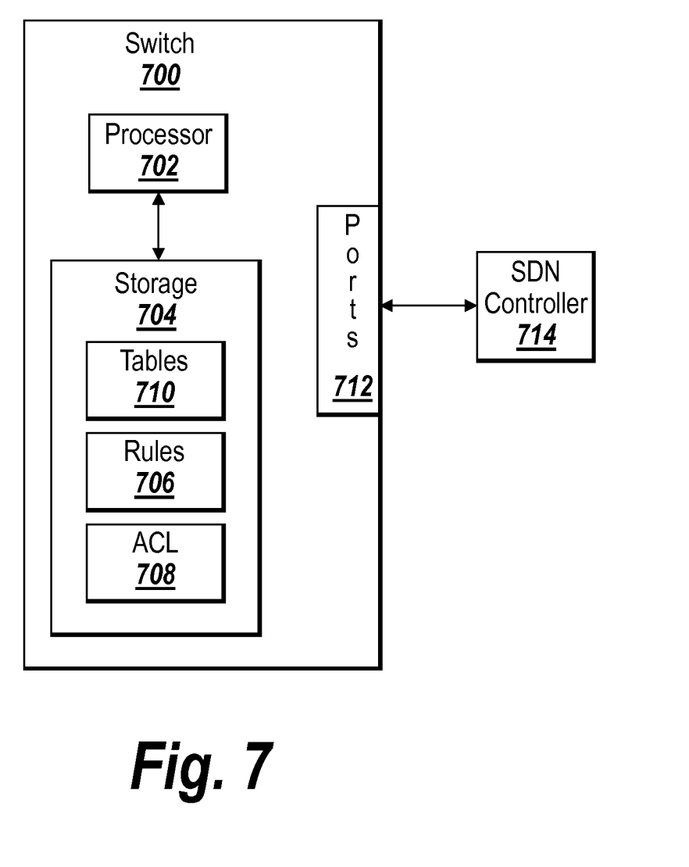
FIG. 7 depicts example of components of a switch that may be deployed in exemplary embodiments.

FIG. 7 provides a high level diagram of a suitable architecture for a switch 700 deployed within the network for the cluster 100. The switch 700 may include a processor 702 such as a microprocessor or controller that is in communication with storage 704. The storage 704 may hold flow rules 706 and other filtering logic. The switch 700 may include an ACL 708 and may include various tables 710 for directing traffic. The ports 712 of the switch 700 may include at least one port that communicates with the SDN controller 714.

One or more of the above-described acts may be encoded as computer-executable instructions executable by processing logic. The computer-executable instructions may be stored on one or more non-transitory computer readable media. One or more of the above described acts may be performed in a suitably-programmed electronic device.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless stated otherwise. The conjunction "or" is meant to be inclusive, unless stated otherwise.

It is intended that the invention not be limited to the particular embodiments disclosed above, but that the invention will include any and all particular embodiments and equivalents falling within the scope of the following appended claims.

The invention claimed is:

1. A method of performing network load balancing in a cluster having switching nodes and hosts, comprising:
   defining a first multicast tree in the cluster for a service, wherein the first multicast tree extends from an initial one of the switching nodes to a first pool of the hosts;
   defining a second multicast tree for the service in the cluster, wherein the second multicast tree extends from a selected one of the switching nodes to a second pool of the hosts;
   multicasting over the first multicast tree so that packets reach hosts in the first pool of hosts hosting sessions associated with the respective packets, wherein the packets are incoming packets for the service to the initial one of the switching nodes;
   multicasting the incoming packets for the service over the second multicast tree so that packets reach hosts in the second pool of hosts hosting sessions associated with the respective incoming packets;
   filtering out at least one of the packets at one of the switching nodes such that each host in the first and second pools of the hosts only receives packets associated with sessions the respective hosts are hosting, wherein the switching nodes are arranged in multiple layers and the filtering occurs at an aggregation switching node within the multiple layers of switching nodes; and
   processing the packets with the first pool of hosts and the second pool of hosts.

2. The method of claim 1, further comprising:
   splitting packet traffic for the service among the first multicast tree and the second multicast tree.

3. The method of claim 1, wherein the selected one of the switching nodes is the initial one of the switching nodes.

4. The method of claim 1, wherein the second pool of hosts is the first pool of hosts.

5. The method of claim 4, further comprising:
   defining a third multicast tree in the cluster for a service, wherein the multicast tree extends from an initial one of the switching nodes to the first pool of the hosts;
   splitting packet traffic among the first multicast tree, the second multicast tree and the third multicast tree.

6. The method of claim 1, further comprising:
   implementing one or more access control lists (ACLs) at one or more of the switching nodes; and
   filtering out attack traffic using the ACLs.

7. The method of claim 1, wherein the first multicast tree and the second multicast tree are disjoint.

8. A method of performing network load balancing in a cluster having switching nodes and hosts, comprising:
   defining a first multicast tree in the cluster for a service, wherein the first multicast tree extends from an initial one of the switching nodes to a pool of the hosts;
   receiving an incoming packet at the initial one of the switching nodes;
   replicating the incoming packet at the initial one of the switching nodes;
   forwarding the incoming packet from the initial one of the switching nodes to a first set of the switching nodes in the first multicast tree;
   forwarding the replicated packet from the initial one of the switching nodes to a second set of the switching nodes in the first multicast tree, the second set of the switching nodes disjoint from the first set of the switching nodes;
   filtering out at least one of the incoming packet and the replicated packet at one of the switching nodes such that each host in the pool of the hosts only receives packets associated with sessions the respective hosts are hosting, wherein the switching nodes are arranged in multiple layers and the filtering occurs at an aggregation switching node within the multiple layers of switching nodes; and
   processing, at hosts within the pool of hosts, at least one of the incoming packet and the replicated packet that arrives at the hosts.

9. The method of claim 8, further comprising:
replicating at least a portion of the incomings packets at one or more of the first set of the switching nodes; or
replicating at least a portion of the replicated incomings packets at one or more of the second set of the switching nodes.

10. The method of claim 9, further comprising:
implementing one or more access control lists (ACLs) at one or more of the switching nodes; and
filtering out attack traffic using the ACLs.

11. The method of claim 9, further comprising:
defining a second multicast tree in the cluster for the service, wherein:
the second multicast tree extends from the initial one of the switching nodes to the pool of hosts, and
the first multicast tree and the second multicast tree are disjoint;
replicating incomings packets received at the initial switching node;
forwarding the incoming packets to a first set of switching nodes in the second multicast tree; and
forwarding the replicated packets to a second set of switching nodes in the second multicast tree so that packets reach the pool of hosts.

12. A system comprising:
a network controller comprising at least one computer processor configured to execute computer executable instructions, the computer executable instructions configured such that when executed they carry out a method comprising:
defining a first multicast tree in a cluster for a service, wherein the first multicast tree extends from an initial switching node in the cluster to a pool of hosts;
receiving an incoming packet at the initial one of the switching nodes;
replicating the incoming packet at the initial one of the switching nodes;
forwarding the incoming packet from the initial one of the switching nodes to a first set of switching nodes in the first multicast tree;
forwarding the replicated packet from the initial one of the switching nodes to a second set of the switching nodes in the first multicast tree, the second set of the switching nodes disjoint from the first set of the switching nodes;
filtering out at least one of the incoming packet and the replicated packet at one of the switching nodes such that each host in the pool of the hosts only receives packets associated with sessions the respective hosts are hosting, wherein the switching nodes are arranged in multiple layers and the filtering occurs at an aggregation switching node within the multiple layers of switching nodes; and
processing, at hosts within the pool of hosts, at least one of the incoming packet and the replicated packet that arrives at the hosts.

13. The system of claim 12, wherein the network controller further executes instructions for:
replicating at least a portion of the incomings packets at one or more of the first set of switching nodes; or
replicating at least a portion of the replicated incomings packets at one or more of the second set of switching nodes.

14. The system of claim 12, wherein the network controller further executes instructions for: implementing one or more access control lists (ACLs) at one or more of the first set of switching nodes or the second set of switching nodes; and filtering out attack traffic using the ACLs.

15. The system of claim 12, wherein the network controller further executes instructions for:
defining a second multicast tree in the cluster for the service, wherein:
the second multicast tree extends from the initial switching node in the cluster to the pool of hosts, and
the first multicast tree and the second multicast tree are disjoint;
replicating incomings packets received at the initial switching node; and
forwarding the incoming packets to a first set of switching nodes in the second multicast tree and the replicated packets to a second set of switching nodes in the second multicast tree so that packets reach the pool of hosts.

16. The system of claim 15, wherein the network controller further executes instructions for:
splitting network traffic for the service among the first multicast tree and the second multicast tree.

* * * * *